(No Model.)
W. HILLMAN.
PACKING FOR PISTON RODS.
No. 533,297. Patented Jan. 29, 1895.
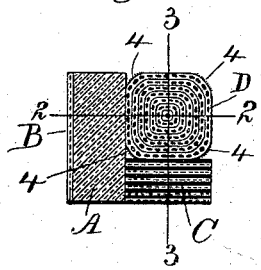
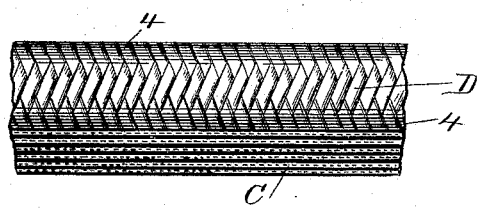
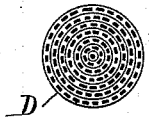
Witnesses
Chas. H. Smith
J. Staib
Inventor
William Hillman
per Lemuel W. Serrell
Atty

UNITED STATES PATENT OFFICE.

WILLIAM HILLMAN, OF MOUNT VERNON, NEW YORK.

PACKING FOR PISTON-RODS.

SPECIFICATION forming part of Letters Patent No. 533,297, dated January 29, 1895.

Application filed September 28, 1894. Serial No. 524,326. (No model.)

*To all whom it may concern:*

Be it known that I, WILLIAM HILLMAN, a citizen of the United States, residing at Mount Vernon, in the county of Westchester and State of New York, have invented an Improvement in Packing for Piston-Rods, of which the following is a specification.

Packings for the stuffing boxes of piston rods and other mechanism have heretofore been made of fibrous material in the form of sheets united together by india rubber and having an elastic backing of rubber, and in some instances fibrous material has been braided into a substantially square cord and made use of either alone or in conjunction with india rubber as an elastic backing.

In all these cases the pressure in setting up the follower of the packing gland has been substantially uniform upon the different parts of the packing, and the fibrous material becomes so tightly consolidated as not to properly absorb and hold the oil or other lubricating material.

The object of the present invention is, first, to provide a strip of fibrous material that is exposed to unequal pressure in the different parts thereof, so that portions of such strip shall serve for making the packing steam or water-tight and other portions of such strip shall act to retain the lubricating material, and, second, to combine with this fibrous strip alternate layers of woven fibrous material and intervening rubber to aid in confining the lubricating material and to increase the extent of wearing surface so that the packing may be rendered more durable, and these are combined with an elastic backing that promotes the efficiency of the packing by rendering it unnecessary to set up the follower of the packing gland frequently.

In the drawings, Figure 1 is a section, and Fig. 2 a side view of a piece of my improved packing. Fig. 3 is a cross section illustrating the strip of fibrous material before it is put into and made a part of the packing.

The layer A of india rubber and its packing or surface B of cloth are similar to those usually employed in rubber packings, and the layers of cloth cemented together by rubber, as represented at C, have also been made use of in rubber packings, the edges of the cloth coming inwardly so as to be in contact with the piston rod or other moving surface.

I make use, in addition to the before named devices, of a strip of fibrous material formed of a cylindrical braided cord D, such cord being composed of two or more layers of braided fibrous material according to the size of the cord requiring to be used for a given size of packing, and the braided cord may be of hemp, flax or other suitable substance, and before it is introduced with the other parts of the packing into the vulcanizing mold, such cord is cylindrical, as shown in Fig. 3, but when introduced into the vulcanizing mold and compressed, such cord is flattened in two directions at right angles to each other, so that the cord is hardened in the direction of the crossing lines 2 and 3, and is rendered substantially rigid in these directions so as to be very compact and adapted to the pressure and wear incident to the use of the packing in a gland or stuffing box; and the intermediate portions of such cord are left comparatively loose and soft so that the parts 4 are well adapted to absorb and hold lubricating material. Hence this packing is better adapted to use than the packings heretofore employed, because the hard or consolidated portions of such packing upon the lines 2 and 3 effectually prevent the passage of fluid through the packing, and the softer portions 4 hold the lubricating material so that the packing is self-lubricating to a greater extent than has been possible in the packings heretofore made use of.

It is sometimes advantageous after the packing has been vulcanized, to saturate the cord D to a greater or less extent with lubricating material, such for instance as melted tallow or paraffine, so that the packing is entirely ready previous to being put on the market for sale and can be introduced into the packing gland to advantage without the necessity of the party using the same applying lubricating material thereto.

I claim as my invention—

1. As a new article of manufacture, a packing composed of a vulcanized rubber backing and a braided circular cord of fibrous material compressed and hardened in a plane parallel to the vulcanized rubber backing and at right angles thereto for solidifying portions of such fibrous cord and allowing other portions to remain in a comparatively soft and open condition for absorbing lubricating material, substantially as set forth.

2. The combination in a vulcanized rubber packing, of a backing of rubber, layers of cloth united by rubber and having the edges of the cloth as a wearing surface for contact with the piston rod or other moving article, and a cord of fibrous material in the angle between the rubber backing and the layers of rubber and cloth, such cord being consolidated by pressure in two directions at right angles to each other, substantially as and for the purposes set forth.

Signed by me this 17th day of September, 1894.

WM. HILLMAN.

Witnesses:
GEO. T. PINCKNEY,
A. M. OLIVER.